United States Patent
Komiyama et al.

(10) Patent No.: US 8,542,383 B2
(45) Date of Patent: Sep. 24, 2013

(54) DATA TRANSFER SYSTEM FOR AN ELECTRONIC DEVICE, A MEDIA PROCESSING DEVICE, AND A CONTROL METHOD FOR A MEDIA PROCESSING DEVICE

(75) Inventors: Takahisa Komiyama, Takeshina-machi (JP); Keiko Yamada, Shojiri (JP)

(73) Assignee: Seiko Epson Corporation, Tokyo (JP)

( * ) Notice: Subject to any disclaimer, the term of this patent is extended or adjusted under 35 U.S.C. 154(b) by 466 days.

(21) Appl. No.: 12/233,390

(22) Filed: Sep. 18, 2008

(65) Prior Publication Data

US 2009/0073471 A1 Mar. 19, 2009

(30) Foreign Application Priority Data

Sep. 19, 2007 (JP) ................................. 2007-242947

(51) Int. Cl.
*G06F 3/12* (2006.01)
(52) U.S. Cl.
USPC .......................................................... 358/1.15
(58) Field of Classification Search
None
See application file for complete search history.

(56) References Cited

U.S. PATENT DOCUMENTS

| | | | | |
|---|---|---|---|---|
| 6,431,670 B1 * | 8/2002 | Schantz et al. | ..................... | 347/7 |
| 6,467,888 B2 * | 10/2002 | Wheeler et al. | ................. | 347/85 |
| 7,013,804 B2 * | 3/2006 | Chelvayohan | ................ | 101/355 |
| 7,130,083 B1 | 10/2006 | Konno et al. | | |
| 7,301,550 B2 * | 11/2007 | Cummins et al. | ............. | 347/171 |
| 7,333,239 B2 | 2/2008 | Oshikawa et al. | | |
| 2003/0025742 A1 * | 2/2003 | Maeda | ............................... | 347/7 |
| 2006/0187507 A1 | 8/2006 | Konno et al. | | |
| 2008/0042889 A1 * | 2/2008 | Cho | ............................. | 341/161 |

FOREIGN PATENT DOCUMENTS

| | | |
|---|---|---|
| JP | 06-246929 A | 9/1994 |
| JP | 11-175276 A | 7/1999 |
| JP | 2001-054962 A | 2/2001 |
| JP | 2001-191511 A | 7/2001 |
| JP | 2004-046339 A | 2/2007 |

OTHER PUBLICATIONS

Krutz, Ronald L., Microprocessors and Logic Design, Nov. 18, 1980, John Wiley & Sons, 105-107.*

* cited by examiner

*Primary Examiner* — Marivelisse Santiago Cordero
*Assistant Examiner* — John Wallace
(74) *Attorney, Agent, or Firm* — Kilpatrick Townsend & Stockton LLP

(57) ABSTRACT

The number of signal lines needed to communicate a plurality of data types and a plurality of data status levels is reduced and the system cost thereby reduced. A first function unit 1 and a second function unit 2 of the function units in an electronic device are connected by a signal bus 3 for communicating a plurality of data types and a plurality of data status values. The first function unit 1 and second function unit 2 each have a data table of status patterns assigning status values to the data types. The first function unit 1 converts the status pattern to conversion data by referring to the data table and sends the conversion data to the second function unit 2. The second function unit 2 reconverts the received conversion data to the status pattern by referring to the data table.

6 Claims, 3 Drawing Sheets

| INK GROUP A | | | CONVERSION VALUE |
|---|---|---|---|
| CYAN | LIGHT CYAN | LIGHT MAGENTA | |
| NORMAL | NORMAL | NORMAL | 0 |
| NEAR-END | NORMAL | NORMAL | 1 |
| NORMAL | NEAR-END | NORMAL | 2 |
| NEAR-END | NEAR-END | NORMAL | 3 |
| NORMAL | NORMAL | NEAR-END | 4 |
| NEAR-END | NORMAL | NEAR-END | 5 |
| NORMAL | NEAR-END | NEAR-END | 6 |
| NEAR-END | NEAR-END | NEAR-END | 7 |
| — | — | — | — |
| REAL-END | NORMAL | NORMAL | 9 |
| NORMAL | REAL-END | NORMAL | 10 |
| REAL-END | REAL-END | NORMAL | 11 |
| NORMAL | NORMAL | REAL-END | 12 |
| REAL-END | NORMAL | REAL-END | 13 |
| NORMAL | REAL-END | REAL-END | 14 |
| REAL-END | REAL-END | REAL-END | 15 |
| — | — | — | — |
| NEAR-END | REAL-END | REAL-END | 17 |
| REAL-END | NEAR-END | REAL-END | 18 |
| NEAR-END | NEAR-END | REAL-END | 19 |
| REAL-END | REAL-END | NEAR-END | 20 |
| NEAR-END | REAL-END | NEAR-END | 21 |
| REAL-END | NEAR-END | NEAR-END | 22 |
| — | — | — | — |
| NORMAL | NEAR-END | REAL-END | 24 |
| NORMAL | REAL-END | NEAR-END | 25 |
| NEAR-END | NORMAL | REAL-END | 26 |
| REAL-END | NORMAL | NEAR-END | 27 |
| NEAR-END | REAL-END | NORMAL | 28 |
| REAL-END | NEAR-END | NORMAL | 29 |
| — | — | — | — |
| — | — | — | — |

FIG. 2

| INK GROUP B | | | CONVERSION VALUE |
|---|---|---|---|
| MAGENTA | YELLOW | BLACK | |
| NORMAL | NORMAL | NORMAL | 0 |
| NEAR-END | NORMAL | NORMAL | 1 |
| NORMAL | NEAR-END | NORMAL | 2 |
| NEAR-END | NEAR-END | NORMAL | 3 |
| NORMAL | NORMAL | NEAR-END | 4 |
| NEAR-END | NORMAL | NEAR-END | 5 |
| NORMAL | NEAR-END | NEAR-END | 6 |
| NEAR-END | NEAR-END | NEAR-END | 7 |
| — | — | — | — |
| REAL-END | NORMAL | NORMAL | 9 |
| NORMAL | REAL-END | NORMAL | 10 |
| REAL-END | REAL-END | NORMAL | 11 |
| NORMAL | NORMAL | REAL-END | 12 |
| REAL-END | NORMAL | REAL-END | 13 |
| NORMAL | REAL-END | REAL-END | 14 |
| REAL-END | REAL-END | REAL-END | 15 |
| — | — | — | — |
| NEAR-END | REAL-END | REAL-END | 17 |
| REAL-END | NEAR-END | REAL-END | 18 |
| NEAR-END | NEAR-END | REAL-END | 19 |
| REAL-END | REAL-END | NEAR-END | 20 |
| NEAR-END | REAL-END | NEAR-END | 21 |
| REAL-END | NEAR-END | NEAR-END | 22 |
| — | — | — | — |
| NORMAL | NEAR-END | REAL-END | 24 |
| NORMAL | REAL-END | NEAR-END | 25 |
| NEAR-END | NORMAL | REAL-END | 26 |
| REAL-END | NORMAL | NEAR-END | 27 |
| NEAR-END | REAL-END | NORMAL | 28 |
| REAL-END | NEAR-END | NORMAL | 29 |
| — | — | — | — |
| — | — | — | — |

FIG. 3

DATA TRANSFER SYSTEM FOR AN ELECTRONIC DEVICE, A MEDIA PROCESSING DEVICE, AND A CONTROL METHOD FOR A MEDIA PROCESSING DEVICE

CROSS-REFERENCES TO RELATED APPLICATIONS

This application claims priority to Japanese Patent Application No. 2007-242947, filed Sep. 19, 2007, the disclosure of which is incorporated by reference herein.

BACKGROUND OF THE INVENTION

1. Field of the Invention

The present invention relates to a data transfer system for an electronic device that transfers information from a first function unit of an electronic device to a second function unit over a signal line. The invention also relates to a media processing device and to a control method for the media processing device.

2. Description of Related Art

As an example of an electronic device that uses a recording agent, inkjet printers can electrically detect the ink resistance, which changes according to the amount of remaining ink, by embedding an electrode in a sponge impregnated with water-based ink inside the ink cartridge and applying a voltage pulse to the electrode. While a main circuit board separate from the carriage detects the ink end using this voltage pulse, the same number of signal wires as colors of ink are needed to connect each of the ink end pins to the detector on the main circuit board. This results in many wire cores in the cable running between the main circuit board and the carriage. See, for example, Japanese Unexamined Patent Appl. Pub. JP-A-H06-246929.

A configuration such as this having a plurality of function units in a single electronic device thus connects the function units with the number of signal wires needed to carry the remaining ink status data to the second function unit. For example, if the printer uses six colors of ink, cyan, light cyan, light magenta, magenta, yellow, and black, and the remaining ink level is monitored in three levels, normal, near-end and real-end, two data bits are required to express these three remaining ink levels. Because there are six colors of ink, 2 bits×6 colors=12 bits, and 12 signal wires are therefore needed.

The data transfer method used in conventional electronic devices thus requires 12 signal wires to transfer the ink type (ink color) and ink level information from the first function unit to the second function unit, and this increases the system cost.

SUMMARY OF THE INVENTION

A data transfer system for an electronic device according to the present invention reduces the number of signal wires needed to carry a plurality of different information values and status signals from a first function unit to a second function unit, and thus enables reducing device cost.

A first aspect of the invention is a data transfer system for an electronic device, wherein a first function unit and a second function unit of the function units in the electronic device are connected by a signal bus for communicating a plurality of data types and a plurality of data status values; the first function unit and second function unit each have a data table of status patterns assigning status values to the data types; the first function unit converts the status pattern to conversion data by referring to the data table and sends the conversion data to the second function unit; and the second function unit reconverts the received conversion data to the status pattern by referring to the data table.

Another aspect of the invention is a media processing device having a first function unit having a program and printing control circuit for printing media using a recording agent; a second function unit having a media transportation means; and a signal bus for communicating a plurality of data types and a plurality of data status values. The first function unit and second function unit each have at least one data table of status patterns assigning status values denoting the remaining recording agent level to the data types denoting the color of the recording agent; the first function unit converts the status pattern to conversion data by referring to the data table and sends the conversion data to the second function unit; and the second function unit returns the received conversion data to the status pattern by referring to the data table.

The data transfer system for an electronic device according to these aspects of the invention enable reducing the number of signal lines connecting the first function unit and second function unit that are disposed for each of the data types and data status levels, and thus enable reducing the cost of the system.

Preferably, the plurality of data types are divided into groups.

This reduces the complexity of the data tables used for status pattern conversion, and enables using relatively small data tables.

Further preferably, the second function unit displays information corresponding to the status pattern.

This aspect of the invention enables visually confirming the status pattern on the second function unit side.

In another aspect of the invention the electronic device includes a printer, the plurality of data types are information denoting colors of printer ink, and the status values represent remaining ink levels.

This aspect of the invention enables reducing the number of signal lines needed for the first function unit to send ink color and ink level information to the second function unit, and thus enables reducing the cost of the system.

In another aspect of the invention the first function unit has a program and printing control circuit for printing on the label side of the media, and the second function unit is an automatic loader for automatically transporting media between a media storage unit, media drive, and the label printer.

This aspect of the invention enables reducing the number of signal lines needed for the printer in the media processing device to send ink color and ink level information to the automatic loader, and thus enables reducing the cost of the system.

Another aspect of the invention is a control method for a media processing device having a first function unit and a second function unit connected by a signal bus for communicating a plurality of data types and a plurality of data status values, wherein the first function unit and second function unit reference the acquired plurality of data types and a data table of status patterns assigning status values to the data types, the first function unit converts the status pattern to conversion data by referring to the data table and sends the conversion data to the second function unit, and the second function unit reconverts the received conversion data to the status pattern by referring to the data table.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 2 is an example of a data table for ink group A in the data transfer system for an electronic device according to a preferred embodiment of the invention.

FIG. 3 is an example of a data table for ink group B in the data transfer system for an electronic device according to a preferred embodiment of the invention.

DESCRIPTION OF THE PREFERRED EMBODIMENTS

Figure 1:
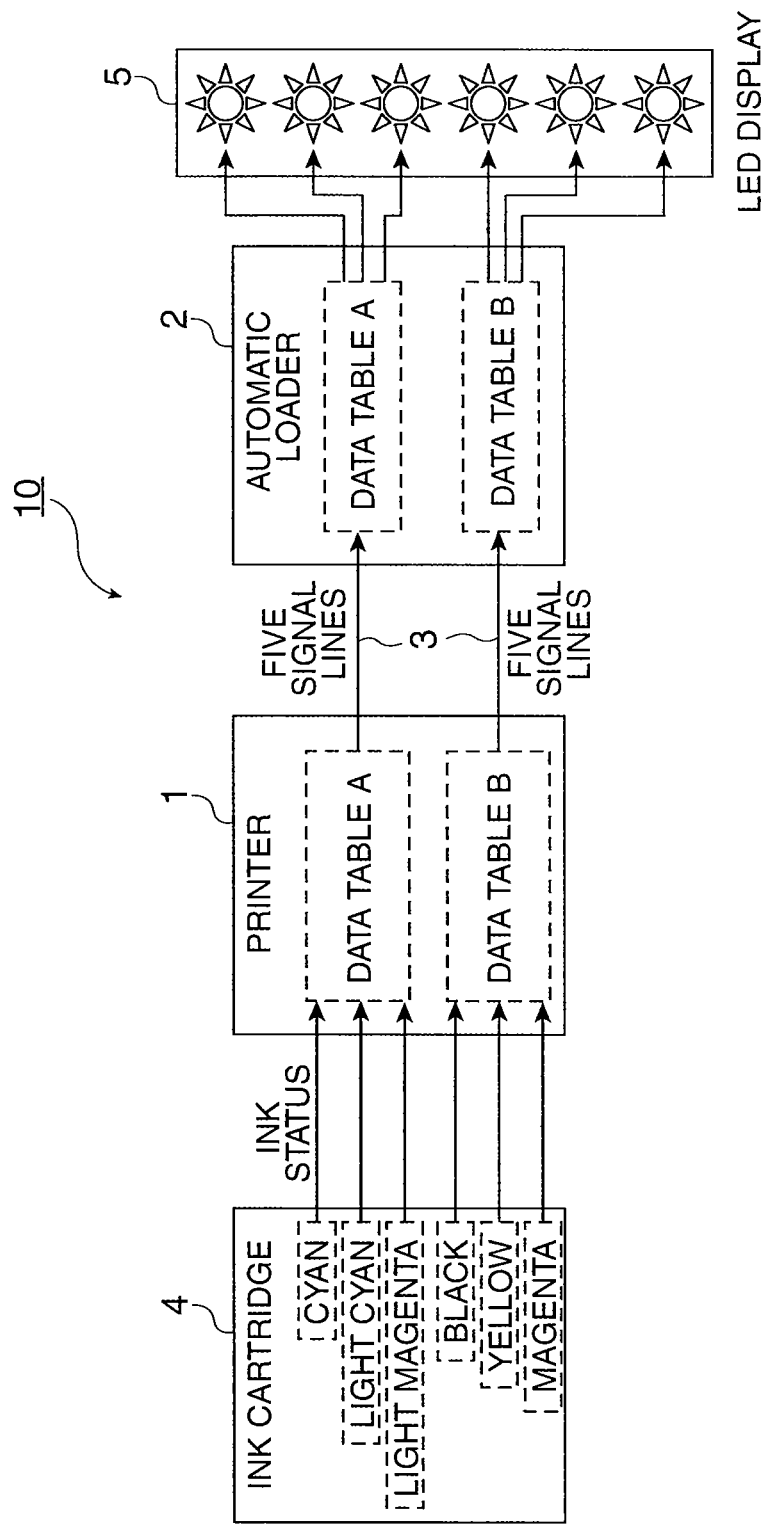
FIG. 1 is a block diagram of a data transfer system for an electronic device according to the invention.

A preferred embodiment of a data transfer system for an electronic device according to the present invention is described below with reference to the accompanying figures.

FIG. 1 is a block diagram of a data transfer system for an electronic device according to the invention, FIG. 2 is an example of a data table for ink group A, and FIG. 3 is an example of a data table for ink group B.

A data transfer system 10 according to this embodiment of the invention is described below using a media processing device as an example of an electronic device. As shown in FIG. 1, a printer 1 as a first function unit and an automatic loader 2 as a second function unit are connected by a signal bus 3.

The printer 1 gets ink status information indicating the remaining ink level (ink status) for each of the six colors used (cyan, light cyan, light magenta, magenta, yellow, and black) from the ink cartridge 4. The printer 1 then refers to the data tables A and B described below to convert the ink status data and sends the converted data over the signal bus 3 to the automatic loader 2.

After receiving the converted data the automatic loader 2 also refers to the data tables A and B to return the converted data to the status pattern, and controls the display state of the LEDs 5 used as the display unit for each of the ink colors according to the remaining ink level (ink status).

The media processing device in this embodiment is a disc publisher for writing data to disc media such as CDs and DVDs, and printing on the label side of the media. The automatic loader 2 has a program and a media transportation control circuit that controls picking and carrying the media between a media storage unit, media drive for writing the data, and a printer for printing the label side of the media. The automatic loader 2 monitors the printer 1 status and manages operation of the media processing device.

The printer 1 has a program and a printing control circuit for printing on the label side of the media, and controls driving a motor (carriage motor) that moves a carriage holding the inkjet head for printing bidirectionally. In this embodiment of the invention the printer 1 acquires the type of ink (ink color) used for printing and the ink status for each ink color, that is, the remaining ink level, from the ink cartridge 4.

The printer 1 also stores the data table shown in FIG. 2 in a storage unit. The data table stores the remaining ink level combinations for each ink color.

The six ink colors are divided into groups of three colors each (ink groups A and B). FIG. 2 shows a data table for ink group A containing the three colors cyan, light cyan, and light magenta. FIG. 3 shows a data table for ink group B containing the three colors magenta, yellow, and black.

Data table A in FIG. 2 shows all status pattern combinations possible when the ink status is reported in the three remaining ink levels of normal, near-end, and real-end for each color of ink in ink group A (cyan, light cyan, light magenta).

The data table B in FIG. 3 shows all status pattern combinations possible when the ink status is reported in the three remaining ink levels of normal, near-end, and real-end for each color of ink in ink group B (magenta, yellow, black).

The real-end status includes the ink cartridge not being installed.

The conversion value for each pattern is stored as a value from 0 to 29 in data tables A and B. This conversion data is sent from the printer 1 to the automatic loader 2 over the signal bus 3.

The automatic loader 2 also stores data tables A and B in a storage unit. The automatic loader 2 refers to data tables A and B to return the received conversion data to the corresponding status pattern, and displays information corresponding to the status pattern. For example, an LED 5 can be provided for each ink color as shown in FIG. 1, and the LEDs 5 can be controlled to light steady, blink, or turn off appropriately.

By compiling the data tables separately for ink groups A and B, the tables are prevented from becoming too large and the software is prevented from becoming complicated. Conversion data for each status pattern combination can thus be compiled using the ink status combinations for ink groups A and B.

For example, if the remaining ink levels (status) for ink group A are cyan=normal, light cyan=near-end, and light magenta=real-end, the conversion value read from the data table in FIG. 2 is 24.

If the remaining ink levels (status) for ink group B are magenta=near-end, yellow=normal, and black=normal, the conversion value read from the data table in FIG. 3 is 1.

The acquired conversion values are then sent from the printer 1 to the automatic loader 2.

The automatic loader 2 receives the conversion values from the printer 1, acquires the status pattern corresponding to the conversion values, and gets the remaining ink level for each color of ink by reading the data tables in FIG. 2 and FIG. 3.

For example, if the conversion value for ink group A is 22, the ink status for each color represented by the status pattern is cyan=real-end, light cyan=near-end, and light magenta=near-end.

If the conversion value for ink group B is 9, the corresponding ink status for each color represented by the status pattern is magenta=real-end, yellow=normal, and black=normal.

The automatic loader 2 compiles the ink status for each color of ink (cyan, light cyan, light magenta, magenta, yellow, and black) from the conversion data, and displays the ink status information. In this embodiment of the invention the LEDs 5 corresponding to each color of ink (cyan, light cyan, light magenta, magenta, yellow, and black) are driven to light steady (indicating normal, for example), blink (indicating a near-end status, for example), or turn off (indicating a real-end status, for example) to display the status of each ink color.

Ink groups A and B each contain three types of ink and three ink status (remaining ink) levels, there are therefore $3 \times 3 \times 3 = 27$ ($<2^5$) possible status patterns for one group, and a total of 10 bits (10 signal wires) are needed to represent the status data for ink groups A and B. The data tables can therefore be rendered relatively small.

If the data tables are compiled without separating them into ink groups A and B, there are $3 \times 3 \times 3 \times 3 \times 3 \times 3 = 729$ ($<2^{10}$) possible combinations of ink type and ink status patterns, and the data table required for status pattern conversion becomes complex. Separating the data into ink groups as described above is therefore preferable.

The data transfer system for an electronic device according to the present invention is not limited to using a media processing device as the electronic device. The invention is also not limited to communicating remaining ink level information, and can be used to communicate other types of information between the function units in an electronic device.

For example, in a system in which a printer has a plurality of paper trays and outputs remaining paper level information for each paper tray, there are four paper trays (for A3, A4, B3, and B4 paper, for example), and three status levels (paper level=full, not full, empty) for each paper tray, there are three status levels (which can be expressed with 2 bits) for each paper tray. The possible combinations can therefore be expressed with 4 (trays)×2=8 bits, requiring 8 wires.

However, if the combinations of paper trays and status levels are compiled in data tables as described above, there are 3×3×3×3=81 ($<2^7$) possible combinations of paper trays and paper levels. These 81 combinations can be expressed with 7 bits, and one bit (one signal line) can therefore be eliminated.

In another application with printer paper trays where there three paper trays (for paper sizes A3, A4, B4) and five status levels for each tray (paper level=full, less than full, near-end, empty, and tray not installed), there are five status levels (expressible by 3 bits) for each tray, requiring 3 (trays)×3 bits=9 bits or 9 signal lines.

However, if the combinations of paper trays and status levels are compiled in data tables as described above, there are 5×5×5=125 ($<2^7$) possible combinations of paper trays and status levels. These 125 combinations can be expressed with 7 bits, and two bits (two signal line) can therefore be eliminated.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A media processing device comprising:
    an ink cartridge that stores a first ink of a first color, a second ink of a second color, a third ink of a third color, and a fourth ink of a fourth color;
    a first function unit that prints a media using the first ink, the second ink, the third ink and the fourth ink, that has a first data table and a second data table, and that gets a remaining ink level of the first ink, the second ink, the third ink and the fourth ink;
    a second function unit that has the first data table and the second data table; and
    a first signal bus; and
    a second signal bus; wherein
    the first data table stores status combinations of the first color, the remaining ink level of the first ink, the second color, the remaining ink level of the second ink, and the one unique conversion value in $2^n$ bits, where n is a natural number, conversion value for each status combination,
    the second data table stores second status combinations of the third color, the remaining ink level of the third ink, the fourth color, the remaining ink level of the fourth ink, and the one unique conversion value in $2^m$ bits, where m is a natural number, conversion value for each second status combination,
    the first function unit converts a first given status combination of the first color, the remaining ink level of the first ink, the second color, and the remaining ink level of the second ink to the first corresponding conversion value read from the first data table and converts a second given status combination of the third color, the remaining ink level of the third ink, the fourth color, and the remaining ink level of the fourth ink to a second corresponding conversion value read from the second data table,
    the first signal bus having n signal wires that sends the first conversion value from the first function unit to the second function unit,
    the second bus has m signal wires and sends the second value from the first function unit to the second function unit, and
    the second function unit converts the first conversion value sent from the first function unit over the first signal bus to the remaining ink level of the first ink and the remaining ink level of the second ink by the first data table and converts the second conversion value sent from the first function unit over the second signal bus to the remaining ink level of the third ink and the remaining ink level of the fourth ink by the second data table.

2. The media processing device described in claim 1, wherein the second function unit comprises a first light-emitting diode (LED) that displays the remaining ink level of the first ink and a second LED that displays the remaining ink level of the second ink.

3. The media processing device described in claim 2, further comprising:
    a media drive unit that writes data to a disc media, and
    a media storage unit that stores the disc media, wherein
    the first function unit is a printer unit that prints on a label side of the disc media, and
    the second function unit is an automatic loader that picks and carries the disc media between the media drive, the media storage unit, and the printer unit, and that comprises the first (LED) and a second LED.

4. The media processing device described in claim 1, wherein each remaining ink level is one of normal, near-end and real-end.

5. A control method for a media processing device, comprising:
    detecting remaining ink levels of a first ink of a first color, a second ink of a second color, a third ink of a third color and a fourth ink of a fourth color in an ink cartridge,
    acquiring the first color, the remaining ink level of the first ink, the second color, the remaining level of the second ink, the third color, the remaining ink level of the third ink, the fourth color, and the remaining level of the fourth ink by a first function unit that prints a medium using the first ink and the second ink,
    converting a first given status combination of the first color, the remaining ink level of the first ink, the second color, and the remaining level of the second ink to a first corresponding value in $2^n$ bits, where n is a natural number, conversion value by a first data table in the first function unit,
    converting a second given status combination of the third color, the remaining ink level of the third ink, the fourth color, and the remaining level of the fourth ink to a second corresponding value in $2^m$ bits, where m is a natural number, conversion value by a second data table in the first function unit,
    sending the first corresponding value from the first function unit over a first signal bus having n signal wires to a second function unit and sending the second corresponding value from the first function unit over a second bus having m signal wires to the second function unit, and converting the first corresponding value to the remaining ink level of the first ink and the remaining level of the second ink by the data table in the second function unit and converts the second conversion value sent from the first function unit over the second signal bus to the remaining ink level of the third ink and the remaining ink level of the fourth ink by the second data table.

6. The control method for the media processing device described in claim 5, further comprising displaying the remaining ink level of the first ink, using a first light-emitting diode (LED) in the second function, and the remaining ink level of the second ink, using a second display unit in the second LED.

* * * * *